United States Patent [19]

Johann et al.

[11] Patent Number: 5,341,360
[45] Date of Patent: Aug. 23, 1994

[54] METHOD AND APPARATUS FOR CALIBRATING LASER WRITE POWER BY AVERAGING UPPER AND LOWER KNEES OF A CALIBRATION PROFILE

[75] Inventors: Donald F. Johann, Palo Alto; Alan C. Burroughs, San Jose; Neil T. Phipps; Feng Li, both of Fremont, all of Calif.

[73] Assignee: Maxoptix Corporation, San Jose, Calif.

[21] Appl. No.: 893,777

[22] Filed: Jun. 5, 1992

[51] Int. Cl.$^5$ ............................................. G11B 7/125
[52] U.S. Cl. ................................. 369/116; 369/54; 369/58
[58] Field of Search ............... 369/116, 54, 124, 58, 369/121; 346/76 L

[56] References Cited

U.S. PATENT DOCUMENTS

| | | | |
|---|---|---|---|
| 4,631,713 | 12/1986 | Romeas et al. | 369/54 |
| 4,858,219 | 8/1989 | Yoshikawa | 369/116 |
| 4,894,817 | 1/1990 | Tanaka et al. | 369/54 |
| 5,050,156 | 9/1991 | Barton | 369/116 |
| 5,182,742 | 1/1993 | Ohmori et al. | 369/116 |

*Primary Examiner*—Paul M. Dzierzynski
*Assistant Examiner*—James Beyer
*Attorney, Agent, or Firm*—Blakely, Sokoloff, Taylor & Zafman

[57] ABSTRACT

In an optical recording system employing a laser for writing digital data onto a storage medium, an apparatus and method for calibrating a laser to a power level which minimizes write errors. A calibration profile is generated by writing test data patterns onto the storage medium by using a number of different predetermined laser power levels. The test data patterns are then read back. The number of write errors is determined for each of the different laser power levels by comparing the written data patterns to the read back data patterns. The calibration profile denotes the number of write errors as a function of laser power levels. Next, an optimum laser power is determined corresponding to an average of an upper and a lower knee of the calibration profile. The laser is calibrated to this optimum power level.

21 Claims, 3 Drawing Sheets

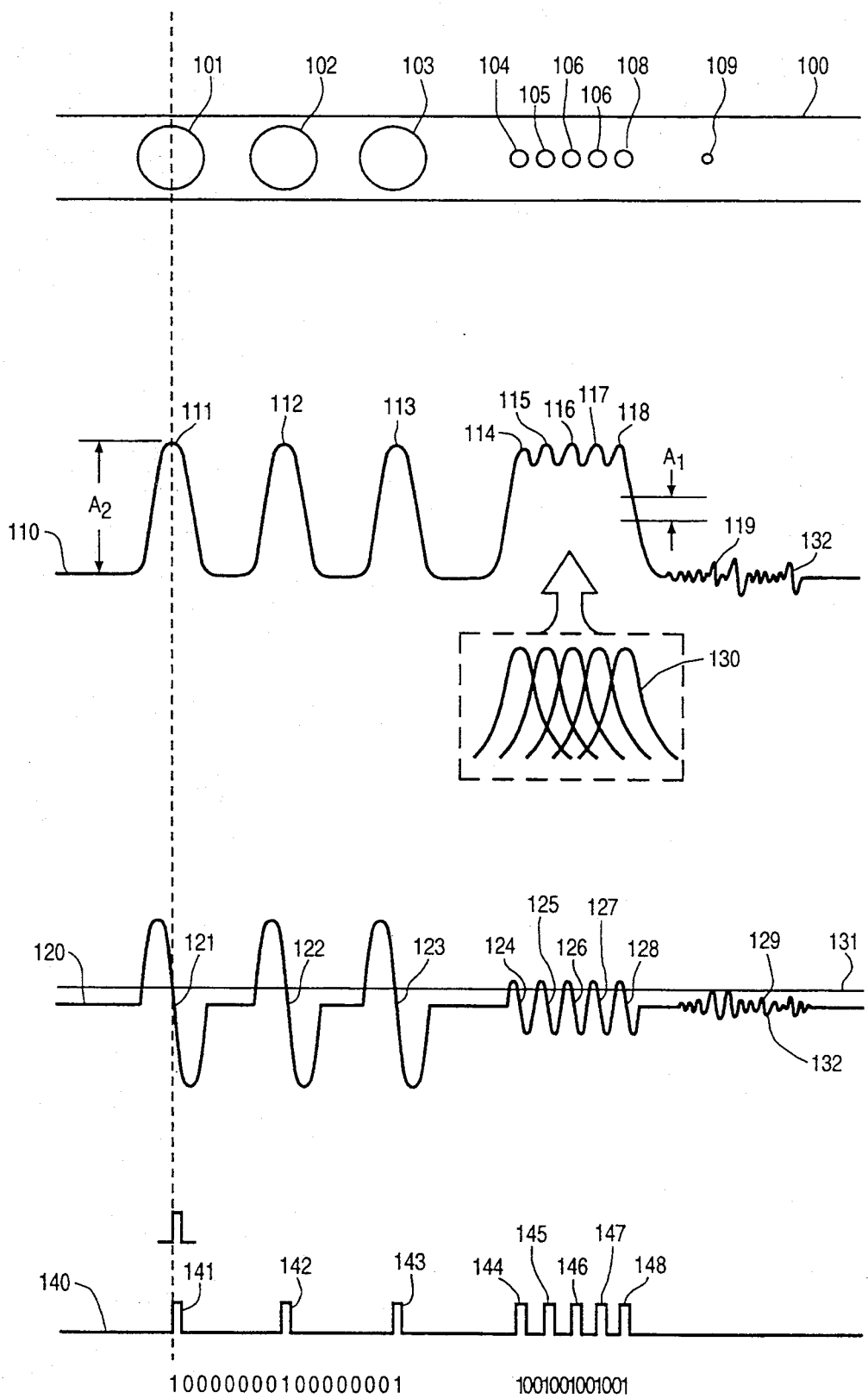
FIG_1

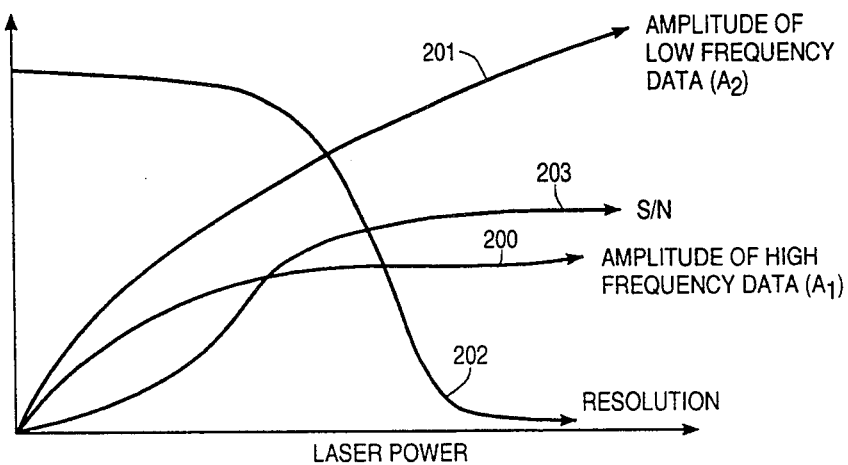
FIG_2
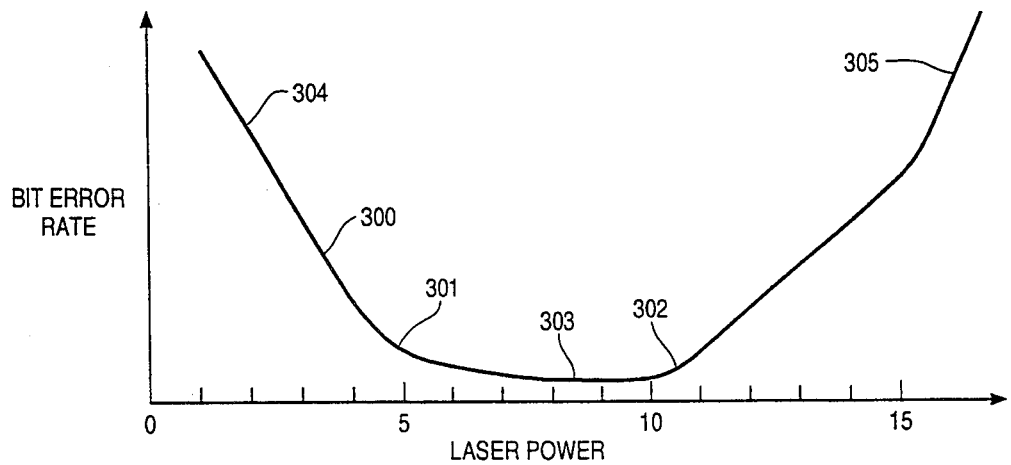
FIG_3
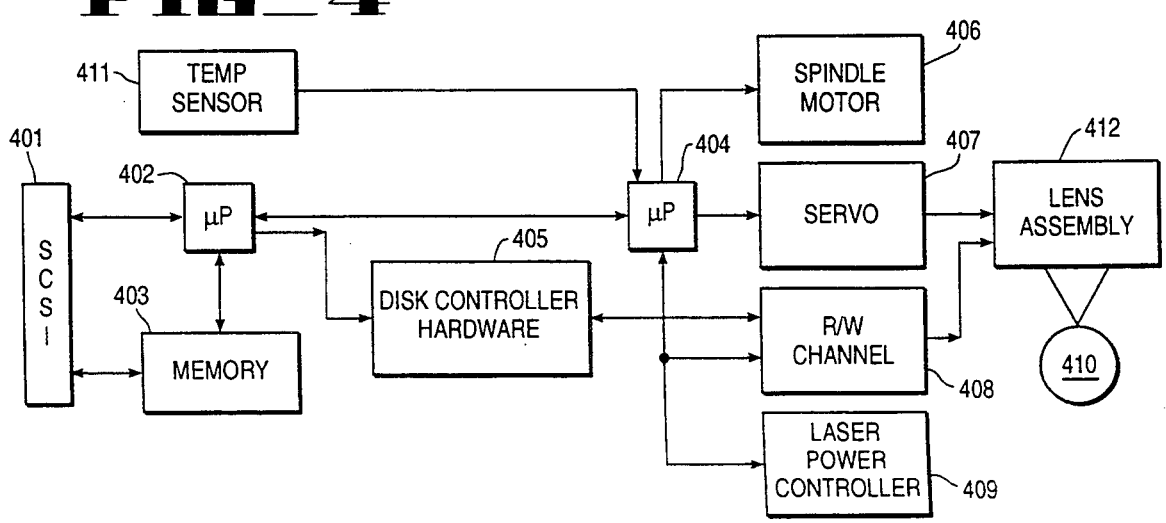
FIG_4

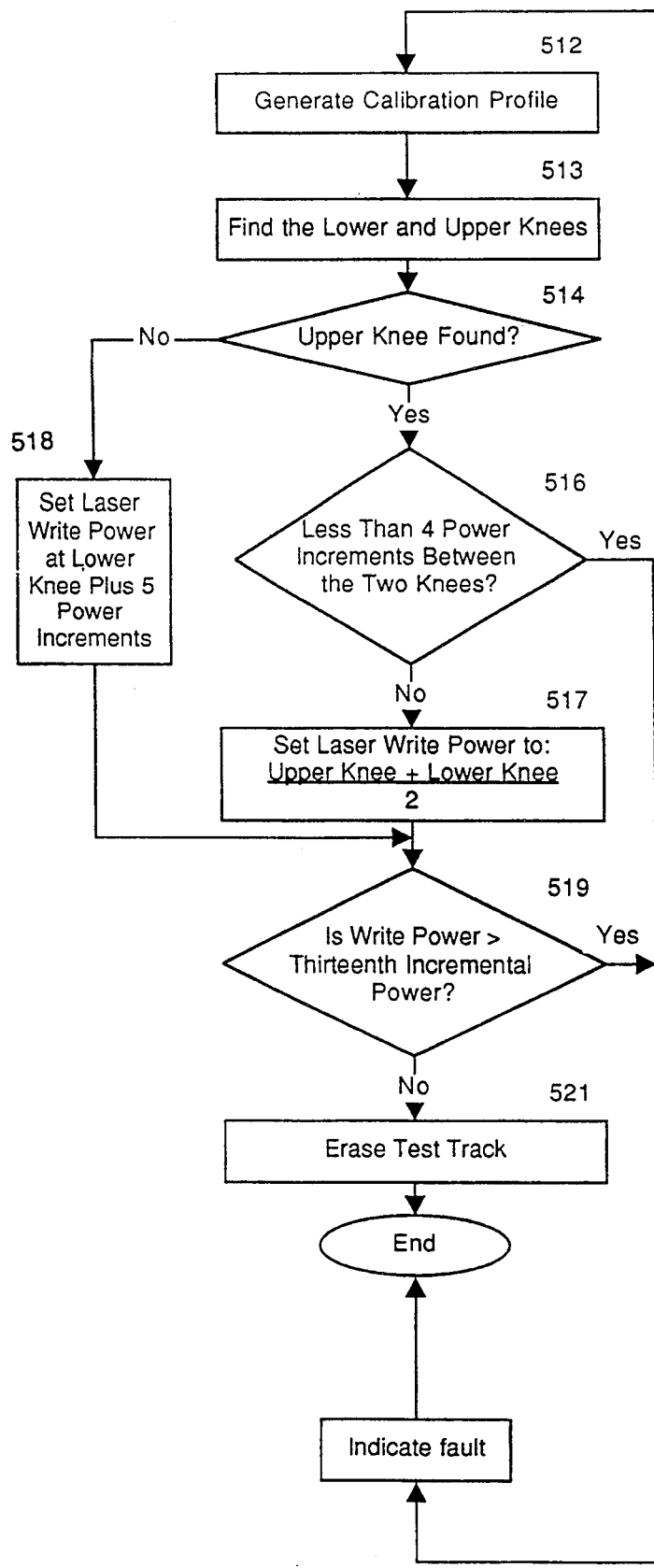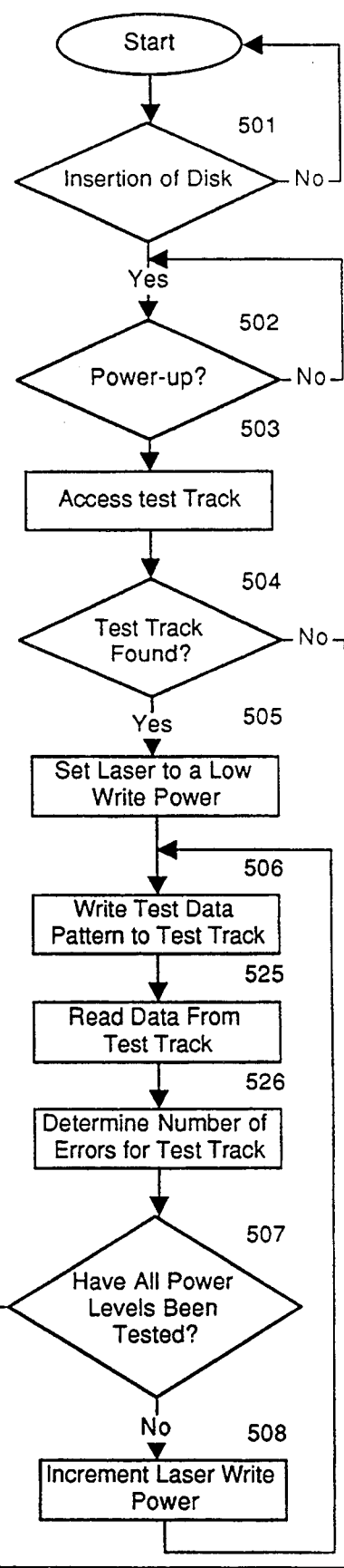
Figure 5

METHOD AND APPARATUS FOR CALIBRATING LASER WRITE POWER BY AVERAGING UPPER AND LOWER KNEES OF A CALIBRATION PROFILE

FIELD OF THE INVENTION

The present invention pertains to the field of optical recording systems. More particularly, the present invention relates to techniques for compensating the power of the laser beam used to write data onto an optical medium.

BACKGROUND OF THE INVENTION

Today, optical-based data storage systems are commercially competitive due to their high storage density, relatively low cost, and random access capability. Moreover, magneto-optical data storage systems offer the added flexibility of allowing an optical medium to be erased and new data written in place of the erased section. This feature grants a user the capability to reuse an optical medium many times over by erasing old data and substituting new data in place thereof.

Basically, magneto-optical recording operates in the following manner. Data is stored as a series of binary bits (i.e., 1's and 0's). A laser beam is focused onto an optical medium, usually by means of a lens assembly. Initially, the optical medium is perpendicularly magnetized. To write a "1", the laser beam is pulsed at a high power for a short duration. This raises the temperature of the optical medium to such a degree that an externally applied magnetic field reverses the direction of magnetization in the heated region. When the medium returns to its lower ambient temperature, the "domain" retains its reverse magnetization.

Data is read from the optical medium by sensing the polarization of the linearly polarized light reflected from a perpendicularly magnetized medium. Hence, the magnetization transitions of the domains stored on the media can be read by determining the direction of the plane of polarization of the reflected light. The same laser beam used to write the data can also be used to generate the reflected light, provided that its power is kept relatively low to minimize any increase in the temperature to the disk.

The domains are "erased" by using the laser to perform the same thermal process used to write the data, except that an oppositely directed external magnetic field is applied. Thereby, the domains revert back to their original magnetization.

As described above, magneto-optical write operations are temperature dependent. In the prior art, the laser beam was kept at a constant power corresponding to an optimum temperature for writing data onto the medium. However, one drawback with the prior art method is that typically, magneto-optical recording devices are operated subject to a wide temperature range. For instance, the device might be operated under very cold conditions (e.g., outdoors, in front of an air conditioner vent, etc.) or very hot conditions (e.g., in direct sunlight, surrounded by equipment which are hot, etc.). Indeed, the temperature of the magneto-optical recording device can vary substantially between when it is first initialized and after it has operated over a length of time.

Consequently, under low temperature conditions, the laser beam's fixed power might be insufficient to properly heat the medium. As a result, the data might not get written onto the medium. Or, if the data does get written, it might be hard to detect when an attempt is subsequently made to read the data. In other words, the data is written so weakly that a read operation might miss part of the data. Conversely, under high temperature conditions, the laser beam's fixed power might be excessive. In extreme circumstances, this might cause permanent damage to the media. Another problem is that excessive power produces larger heated areas. As the areas increase in size, they start to interfere with one another. Consequently, these data bits become hard to detect because of the interference. This problem can be eliminated by writing the data bits a certain distance apart to eliminate the interference between two adjacent bits. However, this implementation is highly disadvantageous because less data is stored within a given area. In other words, the capacity of the device is reduced.

One prior art method for addressing this temperature problem was to implement a probe to measure the temperature of the magneto-optical recording device. Based on its measured temperature, the laser beam's power is adjusted accordingly (i.e., increased power for cooler temperatures and decreased power for higher temperatures). However, this method does not solve all the problems. First, the probe only senses the ambient temperature of the magneto-optical recording device rather than the actual temperature of the active layer of the optical medium. If the temperature of the optical medium is significantly different from that of the magneto-optical recording device (e.g., insertion of a cold optical disk into a magneto-optical disk drive that has been running a long time), the result could be an incorrect laser power being applied. Second, the media sensitivity typically varies from one medium to the next. This is due to imperfect manufacturing processes which lead to large tolerances. For example, one particular optical disk can have a significantly higher/lower sensitivity than another optical disk, even though they were both manufactured in the same lot. Consequently, different optical disks might require different amounts of laser power for optimum writing performance. Requiring tighter sensitivity tolerances would prohibitively increase the costs of the optical disks.

Therefore, what is needed is a simple, efficient, and accurate method/apparatus which adjusts the power of the laser beam for optimum performance, depending on that particular medium and its temperature. It is also desirable to provide such a solution without the need for additional hardware elements (other than those already available in the magneto-optical recording system).

SUMMARY AND OBJECTS OF THE INVENTION

In view of the problems associated with writing data onto a disk by using a laser in a magneto-optical recording system, one object of the present invention is to provide increased operational flexibility for the magneto-optical recording system over a wide range of temperature and media variations.

Another object of the present invention is to increase the reliability of a magneto-optical recording system.

Another object of the present invention is to reduce write errors in a magneto-optical recording system.

Another object of the present invention is to provide an apparatus and method for calibrating the laser power of a magneto-optical recording system to an optimum write power.

Yet another object of the present invention is to allow a magneto-optical recording system to utilize less expensive storage media having greater tolerances, without sacrificing performance.

In a magneto-optical recording system employing a laser for writing data onto a storage medium, the present invention provides an apparatus and method for calibrating the laser to an optimum write power. The laser is initially set to a relatively low power. A data pattern is written onto a test track on the storage medium at this relatively low power. The data pattern is then read back. The read back data pattern is then compared with the written pattern to determine the number of errors. The laser power is then increased and the data pattern is written onto the same test track and then read back and the number of errors counted. This process is repeated at higher and higher laser power levels until the maximum laser power is reached. Thereby, a calibration profile which specifies the number of errors as a function of laser power can be generated. The laser is then calibrated to a power level corresponding to minimal errors, based on the calibration profile.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an illustration of data being stored on a sample track. Various electrical signals representing the stored data are also illustrated.

FIG. 2 is a graph illustrating the relationship between the data spatial frequency, the signal-to-noise ratio, and the resolution.

FIG. 3 is a graph illustrating a typical calibration profile.

FIG. 4 is a block diagram illustrating a magneto-optical disk drive system as may be utilized by the preferred embodiment of the present invention.

FIG. 5 is a flow chart illustrating the steps of the laser calibration process.

DETAILED DESCRIPTION

In a magneto-optical disk drive system, an apparatus and method for adjusting the power of a laser beam in order to provide an optimum temperature for writing data onto a magneto-optical disk is described. In the following description, numerous specific details, such as voltages, frequencies, waveform, etc., are set forth in order to provide a thorough understanding of the present invention. It will be obvious, however, to one skilled in the art that these specific details need not be used to practice the present invention. In other instances, well-known structures and circuits have been shown in block diagram form to avoid unnecessarily obscuring the present invention.

In a typical magneto-optical disk drive system, information is stored on a circular data disk as a series of binary bits (i.e., "1"s and "0"s). A laser beam is focused onto the data disk and is used to write and read the data bits onto and from the data disk. The circular data disk is rotated about a spindle by a spindle motor. A servo mechanism positions the laser beam in reference to various radial locations over the disk surface. Thus, as the laser beam is moved radially across the spinning circular data disk, a number of spiral rings are described. These spiral rings are known as "tracks". Information is stored within these tracks as a series of digital bits, according to an encoding scheme. An encoding scheme is implemented in order to map the data into a pattern which is compatible with the recording media of the data disk. In other words, the encoding scheme enables the magneto-optical disk drive system to physically distinguish between each of the bits stored on the track. A popular encoding scheme is 2,7 encoding.

FIG. 1 illustrates a track 100 which contains a number of "1's", as indicated by the circular spots 101–108. In between each of the "1's" are a number of "0's". The 2,7 encoding scheme specifies that there should be a minimum of two and a maximum of seven "0's" between each pair of "1's". The laser beam writes these spots by applying heat to the disk's surface to reverse the direction of magnetization in the heated region. The more powerful the laser beam, the hotter it becomes, which results in a bigger spot. These spots 101–108 are read back by using the same laser beam, except at a greatly reduced power so as not to accidently write data onto the disk.

The magneto-optical disk drive system then converts the read back spots to an electrical signal 110. It can be seen that each of the spots 101–108, when read back, produces a corresponding electrical pulse, 111–118. As the spots 104–108 are written close together, their pulses start interfering with one another, as shown by signal 130. In effect, the closely spaced spots 104–108 have lower amplitudes, $A_1$, compared with amplitudes, $A_2$, of the widely spaced spots 101–103. Consequently, the amplitude of the read signal is proportional to the spatial frequency of the spots. That is to say, the higher the spatial frequency, the lower the amplitude becomes.

The amplitude of the read-back data is important because it determines the system's resolution. Resolution is defined as the amplitude of the written data pulses at the closest spacing, divided by the amplitude of data written at the maximum spacing (e.g., $A_1/A_2$). The locations of the peaks of the pulses 111–118 are determined by taking the derivative of the read signal 110 and determining the zero crossings of the negative slopes. The derivative signal 120 of read signal 110 is shown in FIG. 1, along with the zero crossings 121–128 which corresponds to the pulse peaks. Based on the zero crossings 121–128 of derivative signal 120, a digital signal 140 is generated by the magneto-optical disk drive system. Note that digital signal 140 has a number of digital pulses ("1's") 141–148 which correctly correspond to the spots 101–108 on the disk.

The pulses represented by derivative signal 120 are also qualified by requiring that they exceed a certain threshold level 131. This is implemented to prevent noise (e.g., media noise, laser noise, etc.) 132 from falsely triggering zero crossings. However, if the signal resolution is low, some of the high frequency pulses might not meet the fixed threshold 131. By spacing the spots far apart (i.e., low spatial frequency), the ideal 100% resolution can be achieved. The trade-off by spacing the spots further apart is that less data is stored within a given area on the disk. This translates into a lower storage capacity. Therefore, the spots should be spaced as close together as possible, to maximize the storage capacity of the disk, without degrading the resolution to the point where errors regularly occur.

The power of the laser beam also affects the size of the spot. Generally, as the laser power is increased, the spot sizes correspondingly increase. However, if the laser power is reduced so that the spot being heated does not reach a certain temperature (i.e., the Curie point), the spot will fail to be written. In essence, the active layer of the disk surface must reach a certain temperature threshold before the data can be written onto the media. Once this temperature threshold is exceeded, the data is written. This is represented as spot 109 in FIG. 1. However, when the spot is read back, only a small amount of signal 119 is detected. The signal is small because its amplitude is a ratio of the relatively small spot area (magnetized in one direction) to the relatively large media area (magnetized in the other direction). The small signal 119 is indistinguishable from the noise 132.

As the laser power is increased, the spot becomes bigger and the signal becomes larger with respect to the noise. The signal to noise (S/N) ratio improves with higher laser powers. This enhances the detection of the pulses when they are read from the disk. However, if the Laser Power exceeds a certain point, the resolution starts to diminish. This is due to the fact that spots with high spatial frequency start to interfere with one another. Referring to FIG. 1, the amplitudes of pulses 111–113, $A_2$, continues to increase with increased laser power, but the amplitudes of pulses 114–118, $A_2$, do not increase due to interference.

This relationship between the spatial frequency of the data, the S/N ratio, and the resolution is shown in FIG. 2. As the laser power is increased, the amplitude of the high frequency data 200 initially increases and then stops increasing due to interference. The amplitude of low frequency data 201 continually increases because, since the spots are spaced far apart, there is no interference. The resolution 202 decreases due to the fact that the amplitude of the high frequency data is decreasing (or constant) while the amplitude of the low frequency data is increasing, which causes the resolution ($A_1/A_2$) to decrease. The S/N ratio 203 initially increases because the signal level increases with the increasing laser power, while the noise level remains constant. When the high frequency data stops increasing in amplitude, the S/N ratio is at its maximum. Therefore, it is important to operate the laser beam at a power level to optimize the S/N, resolution, and capacity of the system.

The present invention optimizes the power of the laser beam by calibrating it to the particular disk being used. The calibration is accomplished by generating a calibration profile for that particular disk and then selecting a laser power based on the error profile.

The currently preferred embodiment of the present invention generates a calibration profile by repeatedly writing a fixed, pre-determined data pattern onto a test track on the disk. The data pattern is written by a write-long command which performs write operations without any error correction code (ECC).

Initially, the laser's power is set at a low level when writing to the test track. The laser power is successively incremented each time the data pattern is written to the test track. In the currently preferred embodiment, the laser power is initially set at 3.5 milliwatts and is incremented fourteen times by 0.5 milliwatts each time. Once the data pattern has been written, it is read back. The data pattern read from the test track is then compared with the data pattern which was written to that track. Any differences between the written data and the read data are errors. Since the test track was written at different laser power settings, the number of errors can be correlated with the laser power. The number of errors as a function of laser power specifies a calibration profile.

The graph of a sample calibration profile 300 is illustrated in FIG. 3. At low laser write powers, 304, the bit error rate (i.e., the number of erroneous bits divided by the number of correct bits) is relatively high due to low S/N ratio. As the laser's write power is increased, the bit error rate decreases and approaches zero because the S/N ratio increases. The bit error rate remains low over a range 301–302 of laser powers. However, as the laser's write power is further increased, the bit error rate starts to increase because the resolution starts degrading. At relatively high laser powers 305, the bit error rate is relatively high due to the low resolution.

The measured calibration profile for a particular disk reflects that disk's inherent sensitivity. The calibration profile is also based on that disk's current temperature. As discussed above, write operations are basically a thermal process. Consequently, if the disk temperature increases, the measured calibration profile shifts to the left. Conversely, if the disk temperature decreases, the calibration profile shifts to the right. By calibrating the laser power to the disk's calibration profile, the disk's sensitivity and temperature can be accounted for.

The selection of the data pattern written to the test tracks is not critical to the present invention. Virtually any data pattern suffices. However, in the currently preferred embodiment of the present invention, a code sequence sensitive to signal-to-noise errors, such as "18C2", is written at the low laser powers. And a code sequence sensitive to resolution errors, such as "55", is written at the high laser powers. This accentuates the high 304 and low 305 power errors and also better defines the "knees" 301 and 302 of the calibration profile 300.

Typically, a calibration profile has a lower knee 301 and an upper knee 302 denoting the points in between which the bit error rate is minimal. The lower knee 301 is defined as the point where the number of errors is more than 5 above the minimum when decreasing the Laser Power from the power that gave the minimum number of errors. The upper knee 302 is defined as the point where the number of errors is more than 5 above the minimum when increasing the Laser Power from the power that gave the minimum number of errors. The laser power is calibrated to the midpoint 303 of the lower knee 301 and the upper knee 302. The reason why the laser power is calibrated to the midpoint 303 rather than towards either of the knees is due to the fact that tracks containing the user's data might have slightly differing sensitivities than the test tracks. Choosing the midpoint 303 allows for greater tolerances on either side to accommodate differing sensitivities on the disk. If no upper knee is found, the laser write power is set to the power corresponding to the lower knee plus 2.5 milliwatts.

A calibration profile is usually generated each time a disk is first spun up. The laser write power is adjusted based on the measured profile, as discussed above. This calibration procedure is repeated two and then four minutes later, and repeated every five minutes thereafter for the first thirty minutes following initial spin-up. Henceforth, the calibration process is repeated every thirty minutes. In short, unique profiles are measured for the disk that is actually being used. These profiles reflect that particular disk's inherent sensitivity and also its reaction over time and temperature. Thus, the laser's write power is optimized by calibrating it according to these profiles.

If the magneto-optical disk drive is too busy to perform a calibration, the laser's write power is adjusted for any change in the drive's temperature since it was last calibrated. For each 5° C. increase in temperature, the laser's write power is decreased by 0.5 milliwatts. Conversely, for every 5° C. decrease in temperature, the laser's write power is increased by 0.5 milliwatts. The magneto-optical disk drive performs the profile calibration at its next earliest opportunity.

FIG. 4 illustrates a magneto-optical disk drive system 400 as may be utilized in accordance with the preferred embodiment of the present invention. The magneto-optical disk drive system 400 is comprised of a SCSI interface 401 which provides an interface between the disk drive system 400 and external instrumentation, usually a computer. The interface is 401 coupled to a controller microprocessor 402 and to memory 403. Controller microprocessor 402 communicates with microprocessor 404 and instructs it per a program stored in memory 403. Controller microprocessor 402 is also coupled to disk controller hardware 405 and temperature sensor 411 through microprocessor 404. Disk controller hardware 405 receives data signals read from the disk 410 via read/write channel 408 and converts it into a byte format. Likewise, when data is written via read/write channel 408, disk controller hardware 405 converts the data into a format compatible for storing on disk 410.

Temperature sensor 411 measures the temperature of the disk drive system 400. Microprocessor 404 controls the spindle motor 406, servo mechanism 407, read/write channel 408 and the laser power controller 409. Spindle motor 406 spins disk 410, and servo mechanism 407 controls the movement of the lens assembly 412, in order to access each of the tracks on disk 410. Read/write channel 408 passes the signals read from and written to disk 410. Laser power controller 409 sets the power of the laser beam used to read and write the data.

The calibration is performed by controller microprocessor 402 which detects initial spin-up of a disk 410 upon power-up. Controller microprocessor 402 then instructs microprocessor 404 to set spindle motor 406 and servo mechanism 407 so that the test track on disk 410 is accessed. The test data pattern is converted by disk controller hardware 405 and written to the test tracks via read/write channel 408. Laser power controller 409 varies the write power of the laser beam as the test data pattern is written to different tracks. Afterwards, the test data pattern is read back from the test tracks via read/write channel 408.

Controller microprocessor 402 compares the written data pattern with the read data pattern and counts the number of errors. The number of errors for each write power is stored in memory 403. This yields the calibration profile. In other words, the calibration profile is stored in memory 403. Laser power controller 409 adjusts the write power of the laser beam according to the calibration profile. Thereafter, this calibration technique is performed periodically. If the disk drive system is too busy to perform this calibration, the laser's write power is adjusted according to the change in the disk drive's temperature since the last calibration, as measured by temperature sensor 411.

FIG. 5 is a flowchart diagram illustrating the steps of the calibration process as embodied by the present invention. The magneto-optical disk drive system waits for power up and insertion of the disk, steps 501 and 502. Once the magneto-optical disk drive system has been powered up and the disk has been inserted, the first test track is accessed, step 503. A determination is then made as to whether the first test track was found, step 504. If no test track was found, a fault indication is generated, step 520. Otherwise, the laser is set to a low right power, step 505.

The test data pattern is written onto the test track, step 506. The data pattern is then read back, step 525, and the number of errors determined, step 526. A determination is made as to whether all Laser Powers have been tried, step 507. If not, the laser write power is incremented step 508. Steps 506, 525, 526, and 507 are then repeated. The calibration profile is generated, step 512. The lower and upper knees are found, step 513. A determination is made as to whether there is an upper knee, step 514 if there is not an upper knee, the laser write power is set at the lower knee level plus five power increments, step 518. Step 519 is then performed.

A determination is made as to whether there is less than four power increments between the lower and upper knees, step 516. If so, a fault indication is generated, step 520. Otherwise, the laser write power is set to (lower knee plus upper knee)/2. Next, a determination is made as to whether the laser write power which had been set is greater than the power level corresponding to the thirteenth increment, step 519. If so, a fault indication is generated, step 520. Otherwise, all test tracks are erased, step 521.

Thus, an apparatus and method for calibrating the laser write power in a magneto-optical recording system which accounts for a particular disk's sensitivity and temperature has been disclosed.

In an alternative embodiment, instead of the number of errors being determined for each power level, some other measure of quality is used. For instance, the amplitude of the high frequency data can be measured at each write power level. The calibration point can then be set to the power at which the amplitude of this data reaches its maximum.

What is claimed is:

1. In an optical recording system having a laser for writing data to a storage medium, a method of calibrating said laser to a power level which minimizes data errors, when said storage medium has been installed within said optical recording system and periodically re-calibrating said laser, said method comprising the steps of:
   generating a calibration profile comprising a number of read errors as a function of different laser power levels by:
   a) writing at least one data pattern to said storage medium at a plurality of different laser power levels;
   b) reading said data pattern;
   c) determining a number of write errors for each of said laser power levels by comparing said written data pattern to said read data pattern;
   determining an optimum laser power level which corresponds to a minimum number of write errors according to said calibration profile by taking an average of a power level corresponding to an upper knee of said calibration profile and a lower knee of said calibration profile; setting said laser to said optimum power level.

2. The method of claim 1 further comprising the step of generating a fault if there is no lower knee.

3. The method of claim 2, wherein said written data pattern includes a data pattern which is sensitive to signal-to-noise errors and a data pattern which is sensitive to low resolution errors.

4. The method of claim 3 further comprises a defaulting step, wherein after said laser power has been initially calibrated, said optical recording system varies said laser power in relation to temperature fluctuations of said magneto-optical recording system.

5. The method of claim 4, wherein said optical recording system is a magneto-optical, phase change, or dye polymer recording system.

6. The method of claim 1 further comprising the step of generating a fault if said optimum power level is above a pre-determined threshold.

7. The method of claim 1 further comprising the step of generating a fault if the difference between said upper and said lower knee is greater than a pre-determined power.

8. In an erasable optical recording system employing a laser for writing data onto a storage medium, a method for calibrating said laser to an optimum write power, comprising the steps of:
   setting said laser to a first power;
   writing a data pattern onto said storage medium by using said laser set at said first power level;
   reading said data pattern written at said first power level;
   determining a first number of errors by comparing said read data pattern with said written data pattern;
   setting said laser to a second power level;
   writing said data pattern onto said storage medium by using said laser set at said second power level;
   reading said data pattern written at said second power level;
   determining a second number of errors by comparing said read data pattern with said written data pattern;
   generating a calibration profile by averaging a power level corresponding to an upper knee of said calibration profile with a power level corresponding to a lower knee of said calibration profile; and
   adjusting said laser to a calibrated power level according to said calibration profile.

9. The method of claim 8, wherein said laser is calibrated when said optical recording system is initialized.

10. The method of claim 9, wherein said laser is periodically calibrated.

11. The method of claim 10, wherein a fault is indicated if there is no lower knee.

12. The method of claim 11, wherein said data pattern comprises a digital code sensitive to signal-to-noise errors and a digital code sensitive to low resolution.

13. The method of claim 12 further comprises a defaulting step, wherein if said erasable optical recording system is unable to generate said calibration profile, said laser power is adjusted based on a measured temperature of said erasable optical recording system.

14. The method of claim 10, wherein a fault is indicated if said calibrated power level is above a pre-determined threshold.

15. The method of claim 10, wherein a fault is indicated if the difference in power between said upper and said lower knee is greater than a pre-determined number.

16. In an optical disk drive system including a laser for reading/writing data from/to a disk, a lens assembly for focusing said laser onto said disk, a spindle motor for rotating said disk, a servo-mechanism for positioning said laser to a desired track on said disk, and an apparatus for calibrating said laser to a power level to minimize errors during a write operation, said apparatus comprising:
   a means for setting said laser at varying power levels;
   a microprocessor for instructing said laser to write data patterns to said disk at a plurality of laser power levels, said microprocessor also instructing said laser to read back said written data patterns;
   a comparator for comparing said read back data patterns with said written data patterns for each of said plurality of laser power levels to determine any differences;
   a counter for counting a number of differences found by said comparator for each of said plurality of laser power levels;
   a memory means for storing a calibration profile which comprises said number of differences in said counter as a function of said plurality of laser power levels;
   a means for determining an optimum laser power by averaging a power level corresponding to an upper knee of said calibration profile and a power level corresponding to a lower knee of said calibration profile;
   a means for calibrating said laser when said disk is initially inserted within said magneto-optical disk drive system; and
   a means for periodically recalibrating said laser.

17. The apparatus of claim 16, further comprising a means for generating a fault indicator, wherein a fault indication is generated whenever there is no lower knee.

18. The apparatus of claim 17, wherein said data patterns include a data pattern which is sensitive to signal-to-noise errors and a data pattern which is sensitive to low resolution errors.

19. The apparatus of claim 18 further comprises a temperature sensor for measuring the temperature of said optical disk drive system, wherein after said laser power has been initially calibrated, said magneto-optical recording system can vary said laser power in relation to said measured temperature of said magneto-optical recording system.

20. The apparatus of claim 16 further comprising a means for generating a fault indicator, wherein a fault indication is generated when said optimum power level is above a pre-determined threshold.

21. The apparatus of claim 16 further comprising a means for generating a fault indicator, wherein a fault indication is generated when the difference between said upper and said lower knee is greater than a predetermined power.

* * * * *